Patented Oct. 7, 1941

2,257,780

UNITED STATES PATENT OFFICE 2,257,780

PROCESS FOR CONCENTRATING FORMALDEHYDE SOLUTIONS

Joseph E. Bludworth, Cumberland, Md., assignor to Celanese Corporation of America, a corporation of Delaware No Drawing. Application May 9, 1939, Serial No. 272,629

15 Claims. (Cl. 260—606)

This invention relates to the production of concentrated solutions of formaldehyde from dilute aqueous solutions of the same.

An object of this invention is the concentration of dilute solutions of formaldehyde. Another object of this invention is the production of concentrated aqueous solutions of formaldehyde. Still another of this invention is the recovery of formaldehyde in the monomeric form in concontrated solutions from dilute aqueous solutions of formaldehyde. Other objects and advantages of the invention will appear from the detailed description and the claims.

The production of comparatively concentrated solutions of formaldehyde from very dilute aqueous solutions has been the object of considerable research and experimentation but without any substantial results. Thus it has not heretofore been possible to produce formaldehyde solutions in concentrations approximating the concentration of commercial formalin from very weak aqueous solutions.

I have now found that if very dilute aqueous solutions of formaldehyde are subjected to distillation in a column at a pressure above atmospheric, the water vapor is suppressed and the gas evolved and that the mixed vapors and gas can be substantially quantitatively separated by subjecting the mixed vapors and gas to a refluxing action at superatmospheric pressure. The water vapor is condensed and returned to the column as reflux and the formaldehyde vapor is carried forward to an absorber which is also maintained at superatmospheric pressure and to which water is fed to the incoming formaldehyde vapors, preferably countercurrent to the latter. By regulating the rate at which the water is fed to the absorber any desired concentration of formaldehyde may be obtained.

In accordance with my invention I feed a very dilute aqueous solution of formaldehyde into a column containing packing such as Raschig rings equivalent to thirty-two trays in a plate column, the pressure in the column being raised to and maintained at about 15 pounds gauge by heating water in a reboiler. At this pressure the boiling point of water is approximately 250° F. and consequently such a temperature must be maintained in the column, at least around the point where the dilute aqueous formaldehyde solution is introduced, in order to vaporize the mixture. The mixed formaldehyde water vapors are passed from the column to a reflux condenser which is also maintained at about 15 pounds gauge and under such conditions that a two-to-one reflux is maintained. Operating under these conditions and passing the uncondensed formaldehyde to an absorber, I obtain water solutions of 35 to 40% formaldehyde.

Although the aqueous formaldehyde solutions thus obtained are satisfactory from the point of view of concentration, the formaldehyde polymerized somewhat on cooling in transit and after absorption so that the product recovered was partially monomer and partially polymer. To reduce this polymerization and to eliminate the production of water from the apparatus, I introduced an inert gas near the top of the column. This circulation of gas had a tendency to carry the evolved formaldehyde forward in the process to an absorber at a velocity sufficient to keep the same from polymerizing in the condenser and transfer lines enroute to the absorber. The diluting effect of the inert gas also assists in delivering the monomer instead of the polymer. As previously pointed out the boiling point of water at 15 pounds gauge is approximately 250° F. but by introducing the inert gas to the third or fourth tray from the top of the column, I was able to reduce the column head temperature sufficiently, to about 238° F., to permit practically all of the water vapor entering the reflux condenser to be knocked back, while at the same time carrying forward the larger portion of the formaldehyde to the absorber. Moreover with the introduction of the inert gas the transfer line from the reflux condenser to the absorber operates at about 80° F. whereas without the gas the transfer line operates at 238° F., which is the same temperature as the top of the column.

By operating in the manner above set out, practically all of the formaldehyde in the feed stock was recovered from the absorber, the residue water in the reboiler containing less than 0.10% of formaldehyde. Knowing the amount of formaldehyde present in the feed stock, it is thus possible to obtain any desired concentration of formaldehyde by regulating the amount of water fed to the absorber.

The present invention also affords a simple and expeditious means of recovering formaldehyde from very dilute aqueous solutions in the paraform where that is desirable. In that case the formaldehyde coming from the reflux column is absorbed in ethyl ether instead of water. After a few minutes the paraformaldehyde appears in the ether as a white precipitate. The ether can then be removed by distillation and the paraformaldehyde recovered in the anhydrous state.

In order to further illustrate my invention but without being limited thereto, the following specific example is given:

Example 17,600 pounds per hour of a one percent solution of formaldehyde at 80 degrees F. was fed onto the tenth tray of a fractionating column operating at 15 pounds gauge. Sufficient heat was applied to the reboiler to create vaporization to the reflux where all the heated vapors were returned as reflux. 2,230 cubic feet per hour of natural gas (essentially methane) was admitted to the third tray from the top of the column. With the addition of this gas and when sufficient reflux was maintained 176 pounds per hour of formaldehyde was carried forward to the absorber where counter-currently or otherwise approximately 292 pounds per hour of water was added in order to obtain a commercial solution of formalin. The temperature in the kettle during operation was approximately 250 degrees F.; the temperature at column head was 238 degrees F., and the temperature in the column from top to bottom varied between these two points. A reflux of two to one based on formaldehyde recovered, or 352 pounds per hour, was maintained, but higher rates of reflux can be used to advantage. The gas from the absorber was recycled to the column at a temperature of about 80 degrees F.

While the process has been described specifically as operated at 15 pounds gauge pressure in the column, reflux condenser and absorber, it is to be understood that lower or higher pressures may be used, just so long as there is maintained a substantial pressure above atmospheric. I have found, however, that superior results are obtained when operating at 15 pounds gauge pressure. The dilute aqueous formaldehyde solution treated in accordance with the present invention may be obtained from any suitable source.

If desired the gaseous formaldehyde carried forward from the reflux condenser can be absorbed in methanol or methylal in place of water. Among the inert gases suitable for use in this process may be mentioned butane, manufactured gas, natural gas, nitrogen and, under properly controlled conditions, air.

It is to be understood that the foregoing detailed description is merely given by way of illustration and that many variations may be made therein without departing from the spirit of my invention.

Having described my invention, what I desire to secure by Letters Patent is:

1. Process for concentrating dilute aqueous solutions of formaldehyde, which comprises distilling said dilute solution in a column at a pressure above atmospheric pressure, introducing into the column an inert gas not condensible under the conditions of distillation subjecting the vapors to a fractional condensation under superatmospheric pressure to separate the water therefrom and collecting the uncondensed formaldehyde in absorbing liquid.

2. Process for concentrating dilute aqueous solutions of formaldehyde, which comprises distilling said dilute solution in a column at a pressure above atmospheric pressure, introducing into the column an inert gas not condensible under the conditions of distillation subjecting the vapors to a fractional condensation under superatmospheric pressure to separate the water therefrom and collecting the uncondensed formaldehyde in water.

3. Process for concentrating dilute aqueous solutions of formaldehyde, which comprises distilling said dilute solution in a column at a pressure above atmospheric pressure, introducing into the column an inert gas not condensible under the conditions of distillation subjecting the mixed water and formaldehyde vapors to a refluxing action under superatmospheric pressure, returning reflux condensate to the column in the ratio of two-to-one, and collecting the uncondensed formaldehyde in water.

4. Process for the production of concentrated aqueous solutions of formaldehyde from dilute aqueous solutions thereof, which comprises distilling the dilute aqueous solution in a column at a pressure above atmospheric pressure, introducing into the column an inert gas not condensible under the conditions of distillation passing the resultant vaporous mixture into a reflux condenser maintained under superatmospheric pressure and under such conditions that practically all of the water entering the reflux condenser is knocked back, and collecting the uncondensed formaldehyde in water in an absorber.

5. Process for the production of concentrated aqueous solutions of formaldehyde from dilute aqueous solutions thereof, which comprises distilling the dilute aqueous solution in a column, maintaining said column at superatmospheric pressure by heating water in a reboiler, introducing into the column an inert gas not condensible under the conditions of distillation, passing the mixture of vapors and gas into a reflux condenser maintained under superatmospheric pressure and under such conditions that substantially all of the water entering the reflux condenser is condensed and the formaldehyde carried forward by the gas to an absorber maintained at superatmospheric pressure, and collecting the uncondensed formaldehyde in water fed to said absorber.

6. Process for the production of concentrated aqueous solutions of formaldehyde from dilute aqueous solutions thereof, which comprises distilling the dilute aqueous solution in a column, maintaining said column at superatmospheric pressure by heating water in a reboiler, introducing into the column an inert gas not condensible under the conditions of distillation, passing the mixture of vapors and gas into a reflux condenser maintained under superatmospheric pressure and under such conditions that substantially all of the water entering the reflux condenser is condensed and the formaldehyde carried forward by the gas to an absorber maintained under superatmospheric pressure, absorbing the uncondensed formaldehyde in water fed to said absorber, and recycling the gas from said absorber to the column.

7. Process for the production of concentrated aqueous solutions of formaldehyde from dilute aqueous solutions thereof, which comprises distilling the dilute aqueous solution in a column, maintaining said column at superatmospheric pressure by the introduction of steam, introducing near the top of the column an inert gas not condensible under the conditions of distillation, passing the mixture of vapors and gas into a reflux condenser maintained under superatmospheric pressure and under such conditions that substantially all of the water entering the reflux condenser is condensed and the formaldehyde carried forward by the gas to an absorber, and collecting the uncondensed formaldehyde in water fed to said absorber.

8. Process for the production of concentrated aqueous solutions of formaldehyde from dilute aqueous solutions thereof, which comprises distilling the dilute aqueous solution in a column, maintaining said column at superatmospheric pressure by the introduction of steam, introducing at about the fourth tray from the top of the column an inert gas not condensible under the conditions of distillation, passing the mixture of vapors and gas into a reflux condenser maintained under superatmospheric pressure and under such conditions that substantially all of the water entering the reflux condenser is condensed and the formaldehyde carried forward by the gas to an absorber, and collecting the uncondensed formaldehyde in water fed to said absorber.

9. Process for the production of concentrated aqueous solutions of formaldehyde from dilute aqueous solutions thereof, which comprises distilling the dilute aqueous solution in a column, maintaining said column at superatmospheric pressure by the introduction of steam, introducing at about the fourth tray from the top of the column an inert gas not condensible under the conditions of distillation, passing the mixture of vapors and gas into a reflux condenser maintained under superatmospheric pressure and under such conditions that substantially all of the water entering the reflux condenser is condensed and the formaldehyde carried forward by the gas to an absorber maintained under superatmospheric pressure, absorbing the uncondensed formaldehyde in water fed to said absorber, and recycling the gas from said absorber to the column.

10. Process for the production of concentrated aqueous solutions of formaldehyde from dilute aqueous solutions thereof, which comprises distilling the dilute aqueous solution in a column, maintaining said column at superatmospheric pressure by the introduction of steam, introducing near the top of the column an inert gas not condensible under the conditions of distillation, passing the mixture of vapors and gas into a reflux condenser maintained at a pressure above atmospheric and under such conditions that substantially all of the water entering the reflux condenser is condensed, returning reflux condensate to the column in the ratio of about two-to-one, passing the formaldehyde and the gas from the reflux condenser to an absorber, and collecting the formaldehyde in water fed to said absorber.

11. Process for the production of concentrated aqueous solutions of formaldehyde from dilute aqueous solutions thereof, which comprises distilling the dilute aqueous solution in a column, maintaining said column at superatmospheric pressure by the introduction of steam, introducing at about the fourth tray from the top of the column an inert gas not condensible under the conditions of distillation, passing the mixture of vapors and gas into a reflux condenser maintained at a pressure above atmospheric and under such conditions that substantially all of the water entering the reflux condenser is condensed, returning reflux condensate to the column in the ratio of about two-to-one, passing the formaldehyde and the gas from the reflux condenser to an absorber, and collecting the formaldehyde in water fed to said absorber.

12. Process for the production of 35-40% aqueous solutions of formaldehyde from aqueous solutions thereof of approximately 1% concentration, which comprises distilling the dilute aqueous solution in a column, maintaining said column at superatmospheric pressure by heating water in a reboiler, introducing near the top of the column an inert gas not condensible under the conditions of distillation, passing the mixture of vapors and gas into a reflux condenser maintained under superatmospheric pressure and under such conditions that substantially all of the water entering the reflux condenser is condensed and the formaldehyde carried forward by the gas to an absorber, and feeding water to the absorber in such amounts that a 35-40% solution of formaldehyde is obtained.

13. Process for the production of 35-40% aqueous solutions of formaldehyde from aqueous solutions thereof of approximately 1% concentration, which comprises distilling the dilute aqueous solution in a column, maintaining said column at superatmospheric pressure by the introduction of steam, introducing at about the fourth tray from the top of the column an inert gas not condensible under the conditions of distillation, passing the mixture of vapors and gas into a reflux condenser maintained at a pressure above atmospheric and under such conditions that substantially all of the water entering the reflux condenser is condensed, returning reflux condensate to the column in the ratio of about two-to-one, passing the formaldehyde and the gas from the reflux condenser to an absorber, and feeding water to the absorber in such amounts that a 35-40% solution of formaldehyde is obtained.

14. Process for the production of 35-40% aqueous solutions of formaldehyde from aqueous solutions thereof of approximately 1% concentration, which comprises distilling the dilute aqueous solution in a column, maintaining said column at superatmospheric pressure by the introduction of steam, introducing at about the fourth tray from the top of the column an inert gas not condensible under the conditions of distillation, passing the mixture of vapors and gas into a reflux condenser maintained at a pressure above atmospheric and under such conditions that substantially all of the water entering the reflux condenser is condensed, returning reflux condensate to the column in the ratio of about two-to-one, passing the formaldehyde and the gas from the reflux condenser to an absorber maintained under superatmospheric pressure, feeding water to the absorber in such amounts that a 35-40% solution of formaldehyde is obtained, and recycling the inert gas from the absorber to the column.

15. Process for the production of a 37.5% aqueous solution of formaldehyde from aqueous solutions thereof of approximately 1% concentration, which comprises distilling the dilute aqueous solution in a column, maintaining said column at about 15 pounds gauge pressure by introducing steam, introducing at about the fourth tray from the top of the column an inert gas not condensible under the conditions of distillation, passing the mixture of vapors and gas into a reflux condenser maintained at about 15 pounds gauge pressure and under such conditions that substantially all of the water entering the reflux condenser is condensed, returning the reflux condensate to the column in the ratio of about two-to-one, passing the formaldehyde and the gas from the reflux condenser to an absorber maintained at about 15 pounds gauge pressure, feeding about 1.66 pounds of water to each pound of formaldehyde to be absorbed, and recycling the inert gas from the absorber to the column.

JOSEPH E. BLUDWORTH.

CERTIFICATE OF CORRECTION.

Patent No. 2,257,780.  October 7, 1941.

JOSEPH E. BLUDWORTH.

It is hereby certified that error appears in the printed specification of the above numbered patent requiring correction as follows: Page 1, first column, line 8, after "another" insert --object--; page 3, first column, line 71, claim 12, for "near the top of" read --into--; and that the said Letters Patent should be read with this correction therein that the same may conform to the record of the case in the Patent Office.

Signed and sealed this 2nd day of December, A. D. 1941.

(Seal)

Henry Van Arsdale,
Acting Commissioner of Patents.